(12) United States Patent
Oh et al.

(10) Patent No.: US 8,843,854 B2
(45) Date of Patent: Sep. 23, 2014

(54) METHOD FOR EXECUTING MENU IN MOBILE TERMINAL AND MOBILE TERMINAL USING THE SAME

(75) Inventors: Se Sook Oh, Seoul (KR); Ho Jae Jung, Seoul (KR); Moon Kyung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 176 days.

(21) Appl. No.: 12/778,984

(22) Filed: May 12, 2010

(65) Prior Publication Data

US 2010/0299635 A1    Nov. 25, 2010

(30) Foreign Application Priority Data

May 21, 2009    (KR) ........................ 10-2009-0044440

(51) Int. Cl.
*G06F 3/048*    (2013.01)
*G06F 3/0488*    (2013.01)
*G06F 3/0482*    (2013.01)

(52) U.S. Cl.
CPC .......... *G06F 3/04883* (2013.01); *G06F 3/0482* (2013.01)
USPC ........... 715/841; 715/811; 715/863; 715/861; 715/856; 715/850; 715/835; 715/814; 715/769; 715/764; 715/702; 345/619; 345/673; 345/156; 455/566

(58) Field of Classification Search
CPC ... G06F 3/017; G06F 3/0482; G06F 3/04817; G09G 5/00; G06T 11/60
USPC ......... 715/811, 841, 863, 862, 856, 850, 835, 715/814, 769, 764, 702; 455/566; 345/619, 345/173, 156
See application file for complete search history.

(56) References Cited

U.S. PATENT DOCUMENTS

| | | | |
|---|---|---|---|
| 5,805,167 A * | 9/1998 | van Cruyningen | 715/808 |
| 6,995,776 B2 * | 2/2006 | Tomita | 345/619 |
| 7,231,609 B2 * | 6/2007 | Baudisch | 715/769 |
| 7,515,142 B2 * | 4/2009 | Park | 345/173 |
| 7,565,628 B2 * | 7/2009 | Kim et al. | 715/856 |
| 7,737,954 B2 * | 6/2010 | Kim | 345/173 |
| 7,761,801 B2 * | 7/2010 | Park | 715/764 |
| 2003/0090495 A1 * | 5/2003 | Tomita | 345/619 |
| 2005/0190147 A1 * | 9/2005 | Kim | 345/156 |
| 2007/0063976 A1 * | 3/2007 | Oga | 345/168 |
| 2007/0075915 A1 * | 4/2007 | Cheon et al. | 345/1.1 |
| 2007/0094620 A1 * | 4/2007 | Park | 715/862 |
| 2007/0247441 A1 * | 10/2007 | Kim et al. | 345/173 |
| 2008/0055263 A1 * | 3/2008 | Lemay et al. | 345/173 |
| 2008/0055269 A1 * | 3/2008 | Lemay et al. | 345/173 |

(Continued)

FOREIGN PATENT DOCUMENTS

| | | |
|---|---|---|
| CN | 101410781 | 4/2009 |
| EP | 2034399 | 3/2009 |
| WO | 2009/018314 | 2/2009 |

*Primary Examiner* — Steven Sax
*Assistant Examiner* — David Choi
(74) *Attorney, Agent, or Firm* — Lee, Hong, Degerman, Kang & Waimey

(57) ABSTRACT

A method for executing a menu in a mobile terminal is disclosed, wherein the method includes displaying a first icon on a touch screen of the mobile terminal, receiving a first multi touch gesture pattern on the first icon, and displaying at least one second icon upon recognition of the first multi-gesture pattern, the at least one second icon a sub icon of the first icon.

10 Claims, 15 Drawing Sheets

(56) References Cited

U.S. PATENT DOCUMENTS

| | | |
|---|---|---|
| 2008/0094371 A1* | 4/2008 | Forstall et al. .................. 345/173 |
| 2008/0098311 A1* | 4/2008 | Delarue et al. .................. 715/739 |
| 2008/0165255 A1* | 7/2008 | Christie et al. ............ 348/207.99 |
| 2008/0174562 A1* | 7/2008 | Kim ................................ 345/173 |
| 2008/0192020 A1* | 8/2008 | Kang et al. ...................... 345/173 |
| 2009/0002332 A1* | 1/2009 | Park et al. ....................... 345/173 |
| 2009/0031253 A1* | 1/2009 | Lee et al. ........................ 715/835 |
| 2009/0046075 A1* | 2/2009 | Kim et al. ....................... 345/173 |
| 2009/0064047 A1* | 3/2009 | Shim et al. ..................... 715/835 |
| 2009/0064055 A1 | 3/2009 | Chaudhri et al. |
| 2009/0077497 A1* | 3/2009 | Cho et al. ....................... 715/814 |
| 2009/0177385 A1* | 7/2009 | Matas et al. .................... 701/209 |
| 2009/0178008 A1* | 7/2009 | Herz et al. ...................... 715/840 |
| 2009/0204928 A1* | 8/2009 | Kallio et al. .................... 715/799 |
| 2009/0228820 A1* | 9/2009 | Kim et al. ....................... 715/769 |
| 2009/0237371 A1* | 9/2009 | Kim et al. ....................... 345/173 |
| 2009/0244023 A1* | 10/2009 | Kim et al. ....................... 345/173 |
| 2009/0267912 A1* | 10/2009 | Wada .............................. 345/173 |
| 2009/0295715 A1* | 12/2009 | Seo et al. ........................ 345/156 |
| 2010/0001967 A1* | 1/2010 | Yoo ................................. 345/173 |
| 2010/0008031 A1* | 1/2010 | Reifman et al. ............. 361/679.3 |
| 2010/0031202 A1* | 2/2010 | Morris et al. ................... 715/863 |
| 2010/0058182 A1* | 3/2010 | Jung ............................... 715/702 |
| 2010/0100855 A1* | 4/2010 | Yoo ................................. 715/863 |
| 2010/0122195 A1* | 5/2010 | Hwang ........................... 715/769 |
| 2010/0164878 A1* | 7/2010 | Bestle et al. ................... 345/173 |
| 2010/0211919 A1* | 8/2010 | Brown et al. ................... 715/863 |
| 2010/0245272 A1* | 9/2010 | Morita ............................ 345/173 |
| 2010/0299635 A1* | 11/2010 | Oh et al. ......................... 715/811 |
| 2011/0041100 A1* | 2/2011 | Boillot ............................ 715/863 |

\* cited by examiner

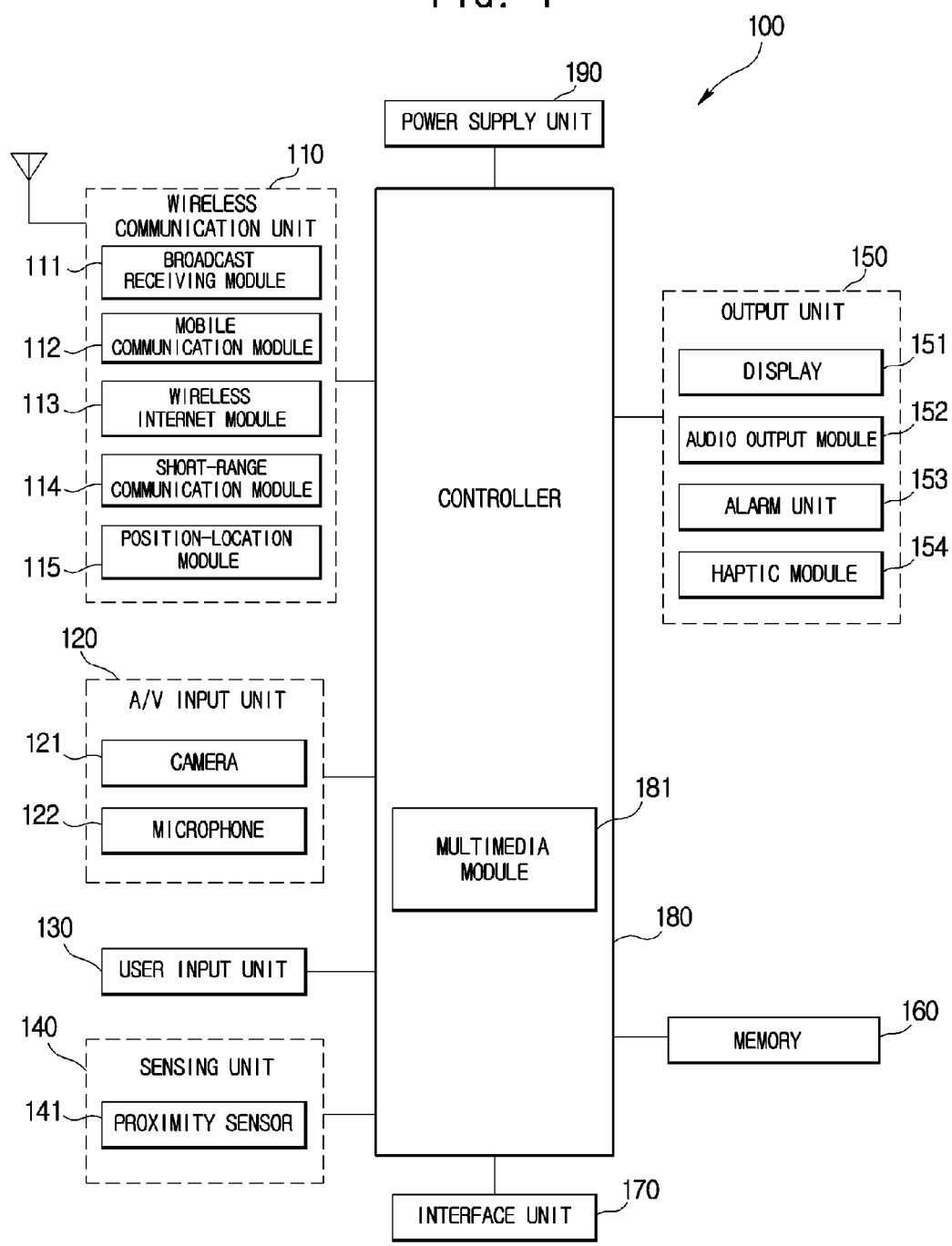

METHOD FOR EXECUTING MENU IN MOBILE TERMINAL AND MOBILE TERMINAL USING THE SAME

Pursuant to 35 U.S.C. §119(a), this application claims the benefit of earlier filing date and right of priority to the Korean Patent Application No. 10-2009-0044440, filed on May 21, 2009, the contents are hereby incorporated by reference as if fully set forth herein in its entirety.

BACKGROUND OF THE DISCLOSURE

1. Field

The present disclosure relates to a method for executing a menu in a mobile terminal and a mobile terminal using the same.

2. Background

Generally, terminals can be classified into mobile/portable terminals and stationary terminals. The mobile terminals can be further classified into handheld terminals and vehicle mount terminals according to possibility of user's direct portability.

As functions of the terminal are diversified, the terminal is implemented as a multimedia player provided with composite functions such as photographing of photos or moving pictures, playback of music or moving picture files, game play, broadcast reception and the like, for example.

To support and increase the terminal functions, improvement of structural parts and/or software parts of the terminal may be considered.

As a multimedia player, the terminal may execute various functions and store many folders and files.

Accordingly, various menu and input technologies has been developed. Particularly, the mobile terminal having a touch screen had been developed. Accordingly, the improved input technology is adapted in the mobile terminal.

SUMMARY

Accordingly, an object of the present disclosure is to provide a method for executing a menu in a mobile terminal, the method comprising: displaying a first icon on a touch screen of the mobile terminal; receiving a first multi touch gesture pattern on the first icon; and displaying at least one second icon upon recognition of the first multi-gesture pattern, the at least one second icon a sub icon of the first icon.

In some exemplary embodiments, the at least one second icon may be a most frequently displayed icon, a most recently displayed icon or a predetermined icon.

In some exemplary embodiments, the method may further comprise determining a number of simultaneous touches of the first multi-touch gesture pattern; and displaying one of more of the at least one second icon according to the number of determined simultaneous touches.

In some exemplary embodiments, the method may further comprise determining a width of the first multi-touch gesture pattern; and displaying one of more of the at least one second icon according to the determined width.

In some exemplary embodiments, the first icon may be a widget displayed on a wall paper of the touch screen or an auto launch menu displayed on the wall paper.

In some exemplary embodiments, the first icon may be a menu icon stored in the mobile terminal.

In some exemplary embodiments, the method may further comprise receiving a second multi touch gesture pattern on the second icon; and no longer displaying the at least one second icon upon recognition of the second multi touch gesture pattern.

In some exemplary embodiments, the at least one second icon may be a widget displayed on a wall paper of the touch screen.

In some exemplary embodiments, no longer displaying the at least one second icon may comprise displaying the first icon that is a higher rank icon of the second icon.

In some exemplary embodiments, the method may further comprise determining a direction of the multi touch gesture pattern; and displaying the at least one second icon according to the determined direction.

Moreover, another object of the present disclosure is to provide a mobile terminal, comprising: a touch screen configured to display a first icon; a controller configured to display at least one second icon upon recognition of a first multi touch gesture pattern received on the first icon, the at least one second icon a lower rank icon of the first icon.

In some exemplary embodiments, the at least one second icon may be a most frequently displayed icon, a most recently displayed icon or a predetermined icon.

In some exemplary embodiments, the controller may be further configured to determine a number of simultaneous touches of the first multi-touch gesture pattern and control the touch screen to display one or more of the at least one second icon according to the determined number of simultaneous touches.

In some exemplary embodiments, the controller may be further configured to determine a width of the first multi-touch gesture pattern and control the touch screen to display one or more of the at least one second icon according to the determined with.

In some exemplary embodiments, the controller may be further configured to determine a direction of the multi touch gesture pattern and control the touch screen to display the at least on second icon according to the determined direction.

In some exemplary embodiments, the first icon may be a widget displayed on a wall paper of the touch screen or an auto launch menu displayed on the wall paper In some exemplary embodiments, the first icon may be a menu icon stored in the mobile terminal.

In some exemplary embodiments, the controller may be further configured to control the touch screen to no longer display the at least one second icon upon recognition of a second multi touch gesture pattern received on the second icon.

In some exemplary embodiments, the at least one second icon may be a widget displayed on a wall paper of the touch screen.

In some exemplary embodiments, the controller may be further configured control the touch screen to no longer display the at least one second icon and display the first icon upon recognition of the second multi touch gesture.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 1 is a block diagram of a mobile terminal in accordance with an exemplary embodiment of the present disclosure.

DETAILED DESCRIPTION

Figure 2A:
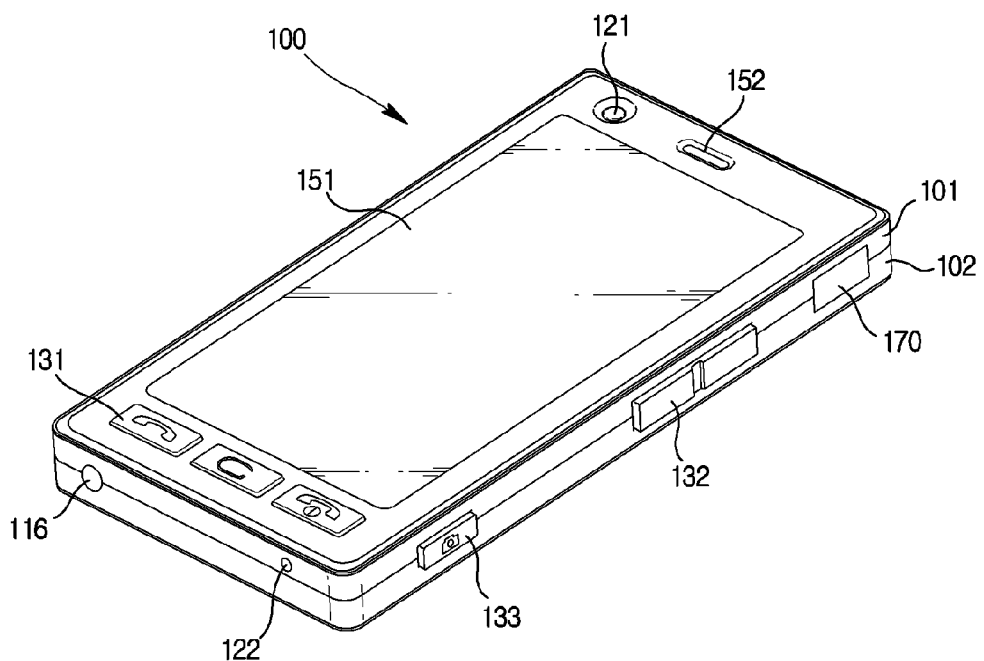
FIG. 2A is a front-view of a mobile terminal according to an exemplary embodiment.

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

Embodiments of the present disclosure may be applicable to various types of terminals. Examples of such terminals may include mobile terminals as well as stationary terminals, such as mobile phones, user equipment, smart phones, DTV, computers, digital broadcast terminals, personal digital assistants, portable multimedia players (PMP) and/or navigators.

A further description may be provided with regard to a mobile terminal, although such teachings may apply equally to other types of terminals.

FIG. 1 is a block diagram of a mobile terminal in accordance with an example embodiment. Other embodiments and arrangements may also be provided. FIG. 1 shows a mobile terminal 100 having various components, although other components may also be used. More or less components may alternatively be implemented.

FIG. 1 shows that the mobile terminal 100 includes a wireless communication unit 110, an audio/video (A/V) input unit 120, a user input unit 130, a sensing unit 140, an output unit 150, a memory 160, an interface unit 170, a controller 180 and a power supply unit 190.

The wireless communication unit 110 may be configured with several components and/or modules. The wireless communication unit 110 may include a broadcast receiving module 111, a mobile communication module 112, a wireless Internet module 113, a short-range communication module 114 and a position-location module 115. The wireless communication unit 110 may include one or more components that permit wireless communication between the mobile terminal 100 and a wireless communication system or a network within which the mobile terminal 100 is located. In case of non-mobile terminals, the wireless communication unit 110 may be replaced with a wire communication unit. The wireless communication unit 110 and the wire communication unit may be commonly referred to as a communication unit.

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information.

At least two broadcast receiving modules 111 may be provided in the mobile terminal 100 to pursue simultaneous reception of at least two broadcast channels or facilitation of broadcast channel switching.

Examples of broadcast associated information may include information associated with a broadcast channel, a broadcast program, a broadcast service provider, etc. For example, broadcast associated information may include an electronic program guide (EPG) of digital multimedia broadcasting (DMB) and an electronic service guide (ESG) of digital video broadcast-handheld (DVB-H).

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (Media-FLO®) and integrated services digital broadcast-terrestrial (ISDB-T). The receiving of multicast signals may also be provided. Data received by the broadcast receiving module 111 may be stored in the memory 160, for example.

The mobile communication module 112 may communicate wireless signals with one or more network entities (e.g. a base station or Node-B). The signals may represent audio, video, multimedia, control signaling, and data, etc.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN)(Wi-Fi), Wibro (Wireless broadband), Wimax (World Interoperability for Microwave Access), and/or HSDPA (High Speed Downlink Packet Access). The wireless Internet module 113 may be replaced with a wire Internet module in non-mobile terminals. The wireless Internet module 113 and the wire Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The position-location module 115 may identify or otherwise obtain a location of the mobile terminal 100. The position-location module 115 may be provided using global positioning system (GPS) components that cooperate with associated satellites, network components, and/or combinations thereof.

The position-location module 115 may precisely calculate current 3-dimensional position information based on longitude, latitude and altitude by calculating distance information and precise time information from at least three satellites and then by applying triangulation to the calculated information. Location and time informations may be calculated using three satellites, and errors of the calculated location position and time informations may then be amended or changed using another satellite. The position-location module 115 may calculate speed information by continuously calculating a real-time current location.

The audio/video (A/V) input unit 120 may provide audio or video signal input to the mobile terminal 100. The A/V input unit 120 may include a camera 121 and a microphone 122. The camera 121 may receive and process image frames of still pictures and/or video.

The microphone 122 may receive an external audio signal while the mobile terminal is in a particular mode, such as a phone call mode, a recording mode and/or a voice recognition mode. The received audio signal may then be processed and converted into digital data.

The mobile terminal 100, and in particular the A/V input unit 120, may include a noise removing algorithm (or noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110. Two or more microphones and/or cameras may also be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch. A specific example is one in which the user input unit 130 is configured as a touchpad in cooperation with a display, as will be described below.

The sensing unit 140 may provide status measurements of various aspects of the mobile terminal 100. For example, the sensing unit 140 may detect an open/close status (or state) of the mobile terminal 100, a relative positioning of components (e.g., a display and a keypad) of the mobile terminal 100, a change of position of the mobile terminal 100 or a component of the mobile terminal 100, a presence or absence of user contact with the mobile terminal 100, and/or an orientation or acceleration/deceleration of the mobile terminal 100.

The mobile terminal 100 may be configured as a slide-type mobile terminal. In such a configuration, the sensing unit 140 may sense whether a sliding portion of the mobile terminal 100 is open or closed. The sensing unit 140 may also sense presence or absence of power provided by the power supply unit 190, presence or absence of a coupling or other connection between the interface unit 170 and an external device, etc.

The sensing unit 140 may include a proximity sensor 141.

The output unit 150 may generate an output relevant to a sight sense, an auditory sense, a tactile sense and/or the like. The output unit 150 may include a display 151, an audio output module 152, an alarm unit 153, a haptic module 154 and/or the like.

The display 151 may display (output) information processed by the terminal 100. For example, in case that the terminal is in a call mode, the display 151 may display a user interface (UI) or a graphic user interface (GUI) associated with the call. If the mobile terminal 100 is in a video communication mode or a photograph mode, the display 151 may display a photographed and/or received picture, a UI or a GUI.

The display 151 may include at least one of a liquid crystal display (LCD), a thin film transistor liquid crystal display (TFT LCD), an organic light-emitting diode (OLED), a flexible display, and a 3-dimensional display.

The display 151 may have a transparent or light-transmittive type configuration to enable an external environment to be seen through. This may be called a transparent display. A transparent OLED (TOLED) may be an example of a transparent display. A backside structure of the display 151 may also have the light-transmittive type configuration. In this configuration, a user may see an object located behind the terminal body through the area occupied by the display 151 of the terminal body.

At least two displays 151 may also be provided. For example, a plurality of displays may be provided on a single face of the terminal 100 by being built in one body or spaced apart from the single face. Alternatively, each of a plurality of displays may be provided on different faces of the terminal 100.

If the display 151 and a sensor for detecting a touch action (hereafter a touch sensor) are constructed in a mutual-layered structure (hereafter a touchscreen), the display 151 may be used as an input device as well as an output device. For example, the touch sensor may include a touch film, a touch sheet, a touchpad and/or the like.

The touch sensor may convert a pressure applied to a specific portion of the display 151 or a variation of electrostatic capacity generated from a specific portion of the display 151 to an electric input signal. The touch sensor may detect a pressure of a touch as well as a position and size of the touch.

If a touch input is provided to the touch sensor, signal(s) corresponding to the touch input may be transferred to a touch controller. The touch controller may process the signal(s) and then transfer corresponding data to the controller 180. The controller 180 may therefore know which portion of the display 151 is touched.

FIG. 1 shows that the proximity sensor 141 can be provided within the mobile terminal 100 enclosed by the touchscreen or around the touchscreen. The proximity sensor 141 may detect a presence or non-presence of an object approaching a prescribed detecting surface or an object existing around the proximity sensor 141 using an electromagnetic field strength or infrared ray without mechanical contact. The proximity sensor 141 may have a longer durability than the contact type sensor and may also have a greater usage than the contact type sensor.

The proximity sensor 141 may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and/or the like. If the touchscreen is an electrostatic type, the proximity sensor 141 may detect proximity of a pointer using a variation of an electric field according to the proximity of the pointer. In this case, the touchscreen (touch sensor) may be classified into the proximity sensor.

An action in which a pointer approaches the touchscreen without contacting the touchscreen may be called a proximity touch. An action in which a pointer actually touches the touchscreen may be called a contact touch. The location of the touchscreen proximity-touched by the pointer may be the position of the pointer that vertically opposes the touchscreen when the pointer performs the proximity touch.

The proximity sensor 141 may detect a proximity touch and/or a proximity touch pattern (e.g., a proximity touch distance, a proximity touch duration, a proximity touch position, a proximity touch shift state, etc.). Information corresponding to the detected proximity touch action and/or the detected proximity touch pattern may be outputted to the touchscreen.

The audio output module 152 may output audio data that is received from the wireless communication unit 110 in a call signal reception mode, a call mode, a recording mode, a voice recognition mode, a broadcast receiving mode and/or the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like.

The alarm unit 153 may output a signal for announcing an event occurrence of the mobile terminal 100. An event occurring in the mobile terminal 100 may include one of a call signal reception, a message reception, a key signal input, a touch input and/or the like. The alarm unit 153 may output a signal for announcing an event occurrence by way of vibration or the like as well as a video signal or an audio signal. The video signal may be outputted via the display 151. The audio signal may be outputted via the audio output module 152. The display 151 or the audio output module 152 may be classified as part of the alarm unit 153.

The haptic module 154 may bring about various haptic effects that can be sensed by a user. Vibration is a representative example for the haptic effect brought about by the haptic module 154. Strength and pattern of the vibration generated from the haptic module 154 may be controllable. For example, vibrations differing from each other may be outputted in a manner of being synthesized together or may be sequentially outputted.

The haptic module 154 may generate various haptic effects including a vibration, an effect caused by such a stimulus as a pin array vertically moving against a contact skin surface, a jet power of air via outlet, a suction power of air via inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. Two or more haptic modules 154 may be provided according to a configuration of the mobile terminal 100.

The memory 160 may store a program for operations of the controller 180. The memory 160 may temporarily store input/output data (e.g., phonebook, message, still picture, moving picture, etc.). The memory 160 may store data of vibration and sound in various patterns outputted in case of a touch input to the touchscreen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory, a programmable read-only memory, a magnetic memory, a magnetic disk, an optical disk, and/or the like. The mobile terminal 100 may operate in association with a web storage that performs a storage function of the memory 160 in the Internet.

The interface unit 170 may play a role as a passage to external devices connected to the mobile terminal 100. The interface unit 170 may receive data from an external device. The interface unit 170 may be supplied with a power and then the power may be delivered to elements within the mobile terminal 100. The interface unit 170 may enable data to be transferred to an external device from an inside of the mobile terminal 100. The interface unit 170 may include a wire/wireless headset port, an external charger port, a wire/wireless data port, a memory card port, a port for coupling to a device having an identity module, an audio input/output (I/O) port, a video input/output (I/O) port, an earphone port and/or the like.

The identity module may be a chip or card that stores various kinds of information for authenticating use of the mobile terminal 100. The identify module may include a user identity module (UIM), a subscriber identity module (SIM), a universal subscriber identity module (USIM) and/or the like. A device provided with the above identity module (hereafter an identity device) may be manufactured in the form of a smart card. The identity device may be connected to the mobile terminal 100 via the port.

The interface unit 170 may play a role as a passage for supplying a power to the mobile terminal 100 from a cradle that is connected to the mobile terminal 100. The interface unit 170 may play a role as a passage for delivering various command signals, which are inputted from the cradle by a user, to the mobile terminal 100. Various command signals inputted from the cradle or the power may work as a signal for recognizing that the mobile terminal 100 is correctly loaded in the cradle.

The controller 180 may control overall operations of the mobile terminal 100. For example, the controller 180 may perform control and processing relevant to a voice call, a data communication, a video conference and/or the like. The controller 180 may have a multimedia module 181 for multimedia playback. The multimedia module 181 may be implemented within the controller 180 or may be configured separate from the controller 180.

The controller 180 may perform pattern recognizing processing for recognizing a handwriting input performed on the touchscreen as a character an/or recognizing a picture drawing input performed on the touchscreen as an image.

The power supply unit 190 may receive an external or internal power and then supply the power required for operations of the respective elements under control of the controller 180.

Embodiments of the present disclosure explained in the following description may be implemented within a recording medium that can be read by a computer or a computer-like device using software, hardware or combination thereof.

According to the hardware implementation, arrangements and embodiments may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, embodiments may be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

FIG. 2A is a front-view of a mobile terminal according to an example embodiment. Other embodiments, configurations and arrangements may also be provided.

As shown in FIG. 2A, the mobile terminal 100 may include a bar type terminal body. Embodiments of the mobile terminal may be implemented in a variety of different configurations. Examples of such configurations may include a folder-type, a slide-type, a bar-type, a rotational-type, a swing-type and/or combinations thereof.

The body may include a case (casing, housing, cover, etc.) that forms an exterior of the terminal. The case may be divided into a front case 101 and a rear case 102. Various electric/electronic parts may be provided in a space between the front case 101 and the rear case 102. A middle case may be further provided between the front case 101 and the rear case 102.

The cases may be formed by injection molding of synthetic resin or may be formed of metal substance such as stainless steel (STS), titanium (Ti) or the like, for example.

The display 151, the audio output unit 152, the camera 121, user input units 130/131/132, the microphone 122, the interface unit 170 and the like may be provided on the terminal body, and more particularly on the front case 101.

The display 151 may occupy most of a main face of the front case 101. The audio output module 152 and the camera 121 may be provided at an area adjacent to one end portion of the display 151, while the user input unit 131 and the microphone 122 may be provided at another area adjacent to the other end portion of the display 151. The user input unit 132 and the interface unit 170 may be provided on lateral sides of the front and rear cases 101 and 102.

The user input unit 130 may receive a command for controlling an operation of the mobile terminal 100. The user input unit 130 may include a plurality of manipulating units 131 and 132. The manipulating units 131 and 132 may be called a manipulating portion and may adopt any mechanism of a tactile manner that enables a user to perform a manipulation action by experiencing a tactile feeling.

Content inputted by the first manipulating unit 131 or the second manipulating unit 132 may be diversely set. For example, a command such as start, end, scroll and/or the like may be inputted to the first manipulating unit 131. A command for a volume adjustment of sound outputted from the audio output unit 152, a command for a switching to a touch recognizing mode of the display 151 or the like may be inputted to the second manipulating unit 132.

Figure 2B:
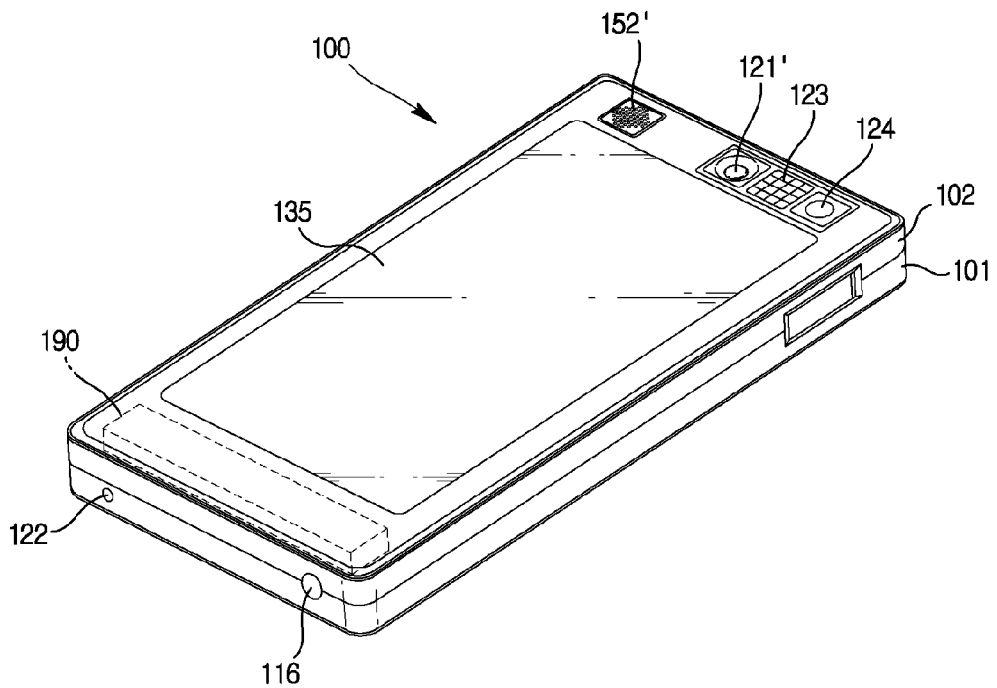
FIG. 2B is a perspective diagram of a backside of the mobile terminal shown in FIG. 2A.

FIG. 2B is a perspective diagram of a backside of the mobile terminal shown in FIG. 2A. Other embodiments, configurations and arrangements may also be provided.

As shown in FIG. 2B, a camera 121' may be additionally provided on a backside of the terminal body, and more particularly on the rear case 102. The camera 121' may have a photographing direction that is substantially opposite to a photographing direction of the camera 121 (shown in FIG. 2A) and may have pixels differing from pixels of the camera 121.

For example, the camera 121 may have a lower number of pixels to capture and transmit a picture of user's face for a video call, while the camera 121' may have a greater number of pixels for capturing a general subject for photography without transmitting the captured subject. Each of the cameras 121 and 121' may be installed on the terminal body to be rotated and/or popped up.

A flash 123 and a mirror 124 may be additionally provided adjacent to the camera 121'. The flash 123 may project light toward a subject in case of photographing the subject using the camera 121'. If a user attempts to take a picture of the user (self-photography) using the camera 121', the mirror 124 may enable the user to view a user's face reflected by the mirror 124.

An additional audio output unit 152' may be provided on the backside of the terminal body. The additional audio output unit 152' may implement a stereo function together with the audio output unit 152 shown in FIG. 2A and may be used for implementation of a speakerphone mode in talking over the terminal.

A broadcast signal receiving antenna 116 may be additionally provided at the lateral side of the terminal body as well as an antenna for communication or the like. The antenna 116 may be considered a portion of the broadcast receiving module 111 shown in FIG. 1 and may be retractably provided on the terminal body.

The power supply unit 190 for supplying a power to the mobile terminal 100 may be provided to the terminal body. The power supply unit 190 may be built within the terminal body. Alternatively, the power supply unit 190 may be detachably connected to the terminal body.

FIG. 2B also shows a touchpad 135 for detecting a touch that is additionally provided on the rear case 102. The touchpad 135 may be configured in a light transmittive type like the display 151. If the display 151 outputs visual information from both faces, the display 151 may recognize visual information via the touchpad 135 as well. The information outputted from both of the faces may be controlled by the touchpad 135. Alternatively, a display may be further provided to the touchpad 135 so that a touchscreen may also be provided to the rear case 102.

The touchpad 135 may be activated by interconnecting with the display 151 of the front case 101. The touchpad 135 may be provided in rear of the display 151 in parallel to one another. The touchpad 135 may have a size equal to or less than a size of the display 151.

Interconnected operational mechanism between the display 151 and the touchpad 135 may now be explained with reference to FIGS. 3A and 3B.

Figure 3A:
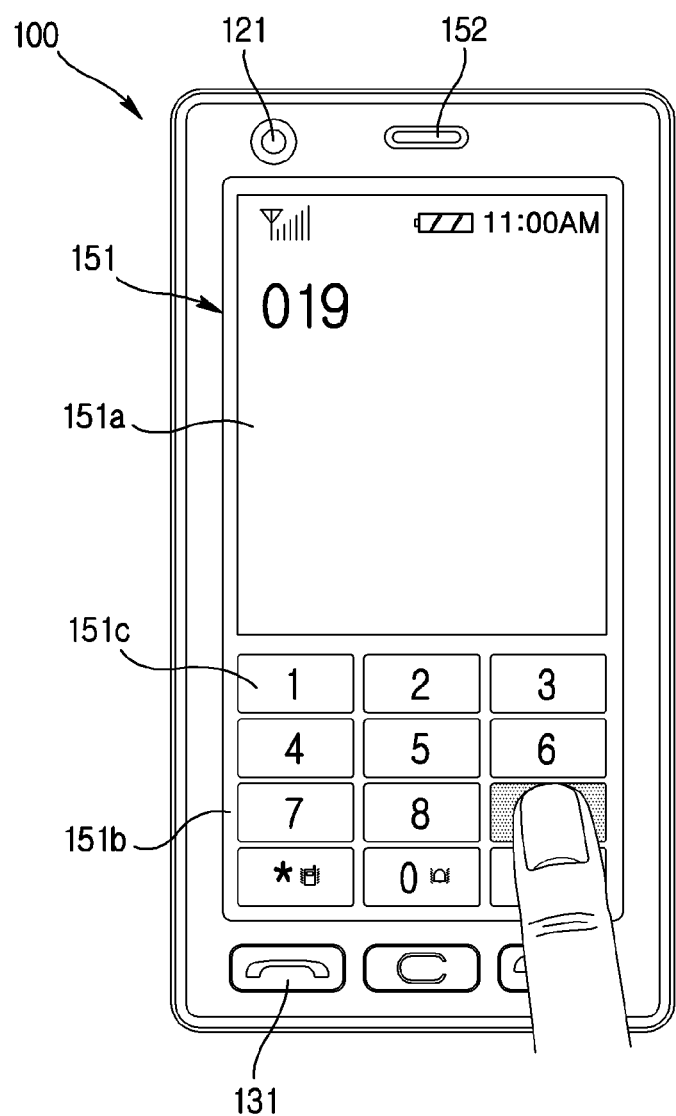
FIGS. 3A and 3B are front-view diagrams of a mobile terminal according to an exemplary embodiment.
Figure 3B:
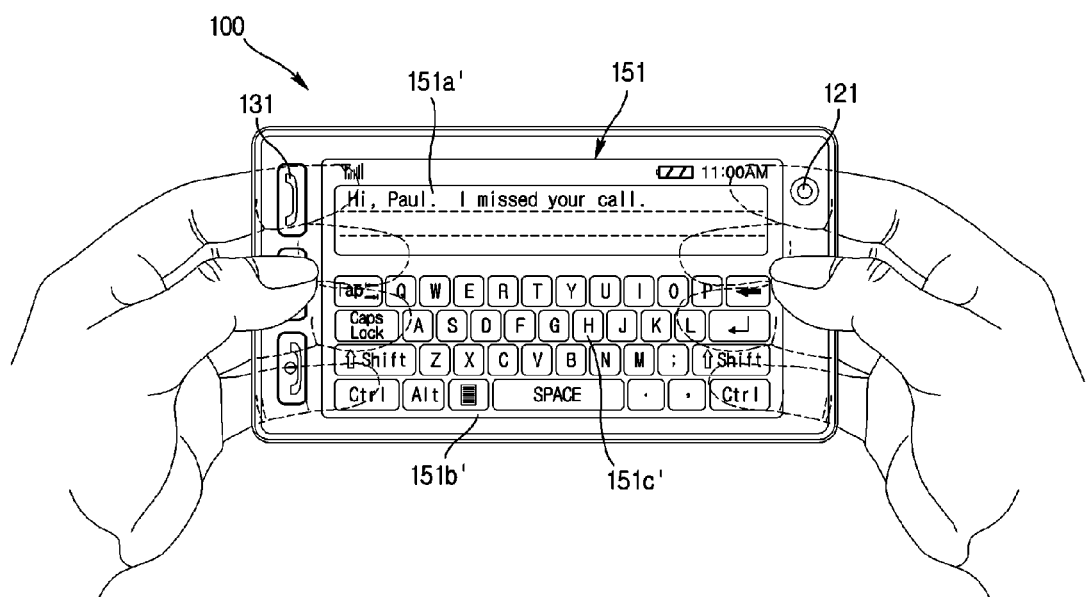

FIGS. 3A and 3B are front-view diagrams of a mobile terminal according to an example embodiment. Other embodiments, configurations and arrangements are also within the scope of the present disclosure.

Various kinds of visual information may be displayed on the display 151. The displayed information may be characters, numerals, symbols, graphics, icons and/or the like.

In order to input the information, at least one of the characters, numerals, symbols, graphics and icons may be represented as a single predetermined array to be implemented in a keypad formation. The keypad formation may be called soft keys.

FIG. 3A shows that an input touch may be applied to a soft key through a front face of a terminal body.

The display 151 may be operable through an entire area or may be divided into a plurality of regions. The plurality of the regions may be configured interoperable.

An output window 151a may be displayed on a top portion of the display 151 and an input window 151b may be displayed on a bottom portion of the display 151. A soft key 151c representing a digit for inputting a phone number or the like may be output to the input window 151b. If the soft key 151c is touched, a digit corresponding to the touched soft key may be outputted to the output window 151a. If the first manipulating unit 131 is manipulated, a call connection for a phone number displayed on the output window 151a may be attempted.

FIG. 3B shows that an input touch may be applied to a soft key through a rear face of a terminal body. FIG. 3A shows that the terminal body is vertically arranged (i.e., in a portrait manner). FIG. 3B shows that the terminal body is horizontally arranged (i.e., in a landscape manner). The display 151 may change an output picture according to the arranged direction of the terminal body.

FIG. 3B also shows that a text input mode is activated in the mobile terminal 100. FIG. 3B shows that the display 151 may include an output window 151a' and an input window 151b'. The output window 151a' and the input window 151b' may be displayed on the display 151. A plurality of soft keys 151c' representing characters, symbols and/or digits may be arranged in the input window 151b'. The soft keys 151c' may be arranged in a QWERTY key formation.

If the soft keys 151c' are touched using the touchpad 135, the characters, symbols and/or digits corresponding to the touched soft keys may be outputted to the output window 151a'. Touch input via the touchpad 135 may be advantageous in that the soft keys 151c' may be prevented from being blocked by a finger in case of touch, which is compared to the touch input via the display 151. If the display 151 and the touchpad 135 are transparent, the mobile terminal 100 may visually check or determine whether fingers are located at the backside of the terminal body. Hence, more correct touch inputs may be made.

The display 151 and/or the touchpad 135 may receive a touch input by scrolling. A user may scroll the display 151 or the touchpad 135 to shift a cursor or pointer located at an entity (e.g., icon or the like) displayed on the display 151. If a finger is shifted on the display 151 or the touchpad 135, a path of the shifted finger may be visually displayed on the display 151. This may be useful in editing an image displayed on the display 151.

If both the display (touchscreen) 151 and the touchpad 135 are touched together within a predetermined amount of time, a particular function of the mobile terminal 100 can be executed. The simultaneous touch may correspond to a case that the terminal body is held by a user using a thumb and a first finger (clamping). The function may include activation or deactivation for the display 151 or the touchpad 135.

On the other hand, it is assumed that the display unit 151 is a touch screen.

In the following description, the method for executing a menu in the mobile terminal according to the present disclosure will be explained, referring to FIGS. 4 and 5.

Figure 4:
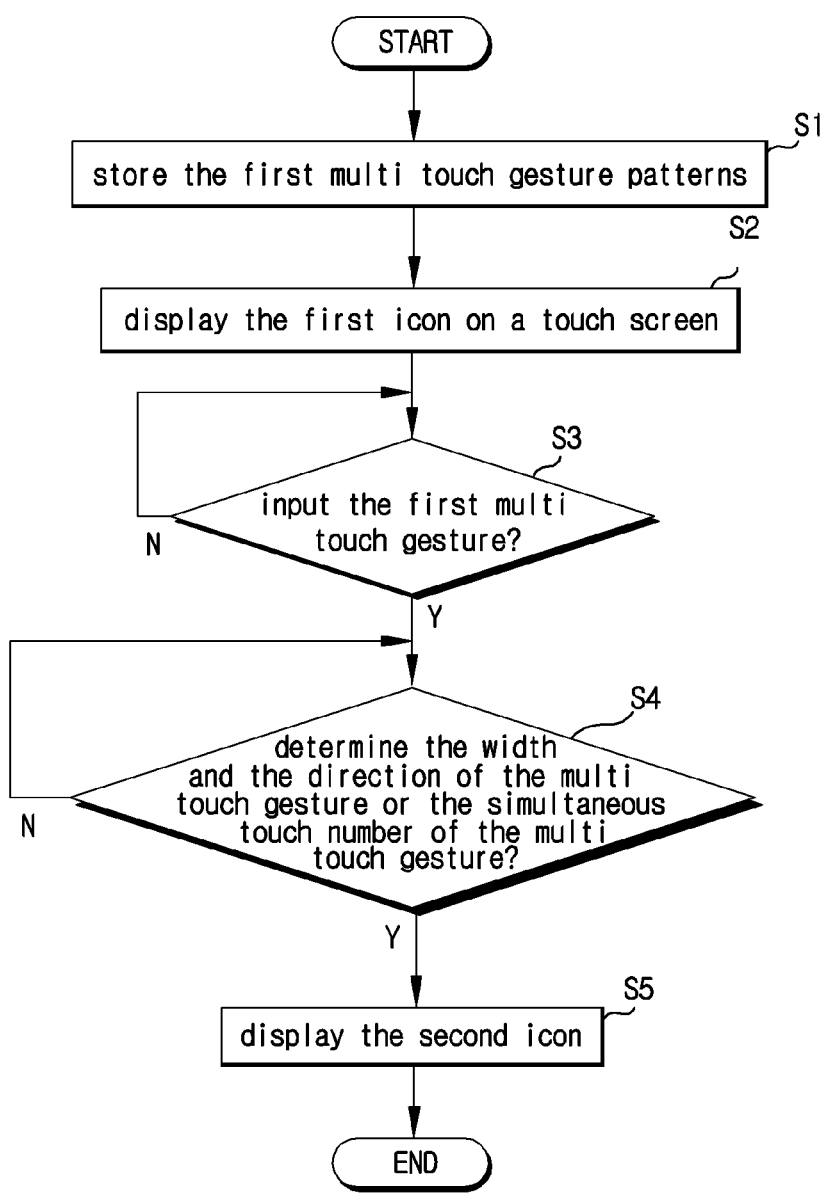
FIG. 4 is a flow chart for explaining a first exemplary embodiment in the method for executing a menu in the mobile terminal, according to the present disclosure.
Figure 5:
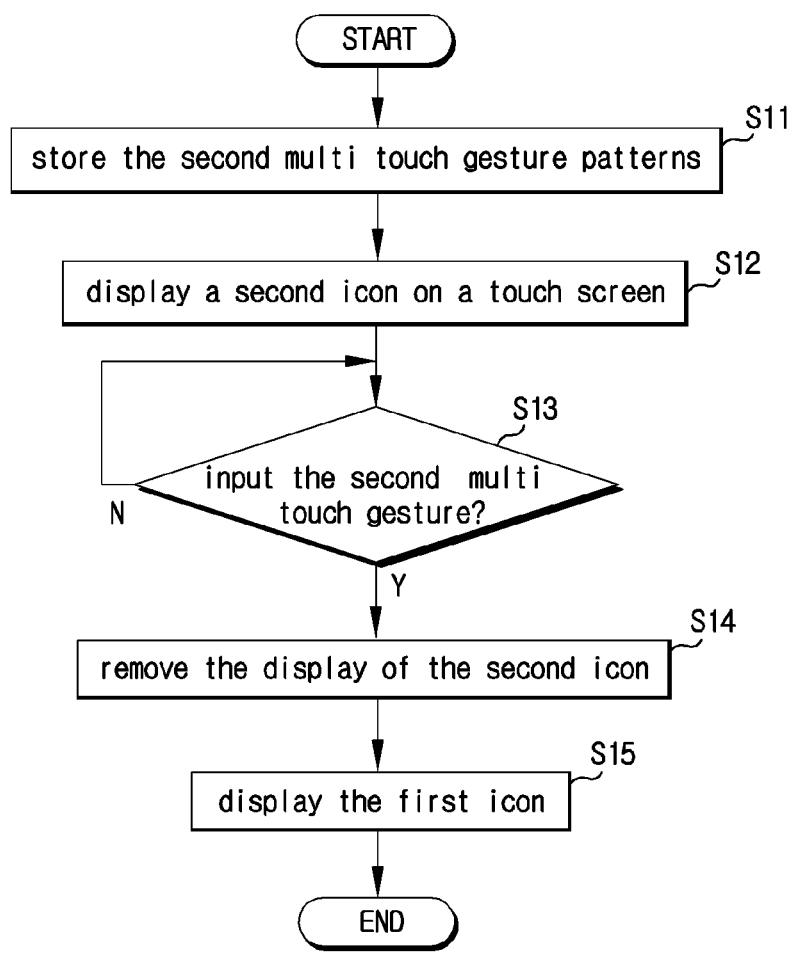
FIG. 5 is a flow chart for explaining a second exemplary embodiment in the method for executing a menu in the mobile terminal, according to the present disclosure.

FIG. 4 is a flow chart for explaining a first exemplary embodiment in the method for executing a menu in the mobile terminal, according to the present disclosure and FIG. 5 is a flow chart for explaining a second exemplary embodiment in the method for executing a menu in the mobile terminal, according to the present disclosure.

[First Exemplary Embodiment]

FIG. 4 is a flow chart for explaining a first exemplary embodiment in the method for executing a menu in the mobile terminal, according to the present disclosure.

As shown in FIG. 4, first multi touch gesture patterns are stored in the memory 160 of the mobile terminal 100 (S1). Here, the first multi touch gesture pattern means a gesture pattern for generating a sub icon of the icon, in a state that at least two points are detected at the same time. For example, a gesture of spreading a thumb and an index finger after both fingers are touched on the touch screen may be included in the multi touch gesture pattern. In a state that the multi touch gesture patterns are stored in memory 160, the controller 180 displays a first icon on a touch screen 151 of the mobile terminal 100. Namely, if the user touches a wall paper of the mobile terminal 100, the most frequent icon may be displayed. In a state that the first icon is displayed on the touch screen, the controller 180 of the mobile terminal 100 monitors whether the user has inputted the first multi touch gesture pattern on the first icon (S3). If the controller 180 determines that the first multi touch gesture is inputted from the touch screen, the second icon which is a low rank icon of the first icon is displayed (S5). At this time, a width of the multi touch gesture, a direction of the multi touch gesture, and the simultaneous touch number of the multi touch gesture may be considered (S4). Namely, if the width of the multi touch gesture is wider than a reference width, at least two second icons may be displayed. If the width of the multi touch gesture is narrower than the reference width, a single second icon may be displayed. If the number of the multi touch gesture is three, two second icons may be displayed. If the number of the multi touch gesture is two, one second icon may be displayed. Alternatively, if a direction of the multi touch gesture is a top direction, the second icon may be displayed on the first icon. If a direction of the multi touch gesture is a bottom direction, the second icon may be displayed under the first icon. These examples will be described in the following description, referring to FIGS. 6A to 12.

According to the first embodiment of the present disclosure, the user may easily access the wanted menu by inputting the simple gesture on the touch screen.

[Second Exemplary Embodiment]

FIG. 5 is a flow chart for explaining a second exemplary embodiment in the method for executing a menu in the mobile terminal, according to the present disclosure.

As shown in FIG. 5, second multi touch gesture patterns are stored in the memory 160 of the mobile terminal 100 (S11). Here, the second multi touch gesture pattern means a gesture pattern for removing the displayed icon in a state that at least two points are detected at the same time. For example, a gesture of closing or narrowing a thumb and an index finger after both fingers are touched on the touch screen may be included in the multi touch gesture pattern. In a state that the second multi touch gesture patterns are stored in memory 160, the controller 180 displays a second icon on a touch screen 151 of the mobile terminal 100 (S12). At this time, at least two second icons are displayed. In a state that the second icon is displayed on the touch screen, the controller 180 of the mobile terminal 100 monitors whether the user has inputted the second multi touch gesture on the second icon (S13). If the controller 180 determines that the second multi touch gesture pattern is inputted from the touch screen, the display of one of the plurality of the second icons is removed (S14). At this time, the first icon which is a high rank menu of the second icon may be displayed together (S15). These examples will be described in the following description, referring to FIGS. 6A to 12.

According to the second exemplary embodiment of the present disclosure, the user may easily move the menu by inputting the simple gesture on the touch screen.

In the following description, the mobile terminal where the method for executing a menu in the mobile terminal is applied, according to the present disclosure, will be explained, referring to FIGS. 6A to 12.

Figure 6A:
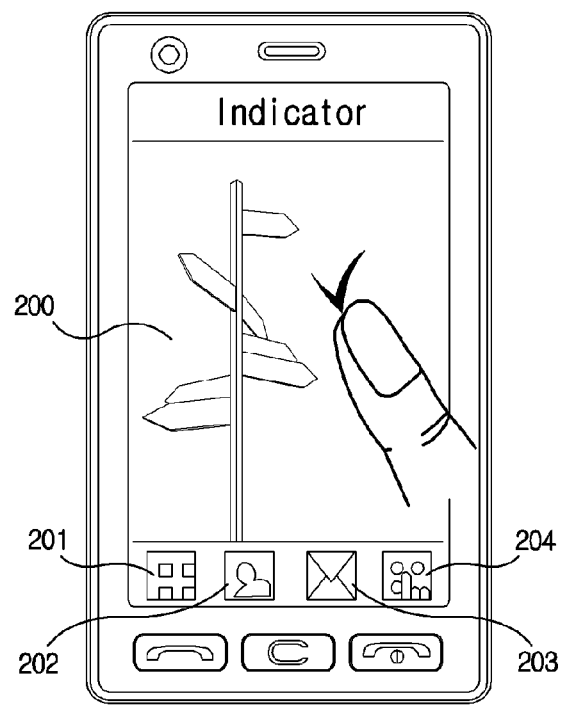
FIGS. 6A-6E are an image diagram of a first implementation in the mobile terminal where the method for executing a menu in the mobile terminal is applied, according to the present disclosure.
Figure 6B:
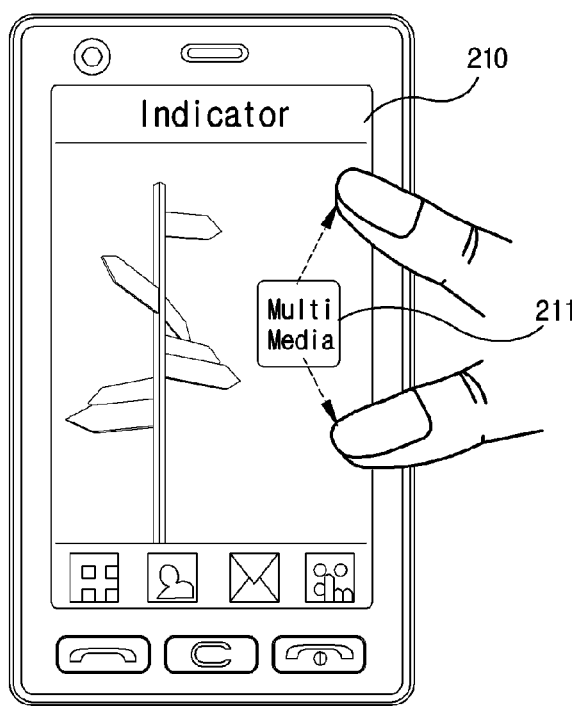
Figure 6C:
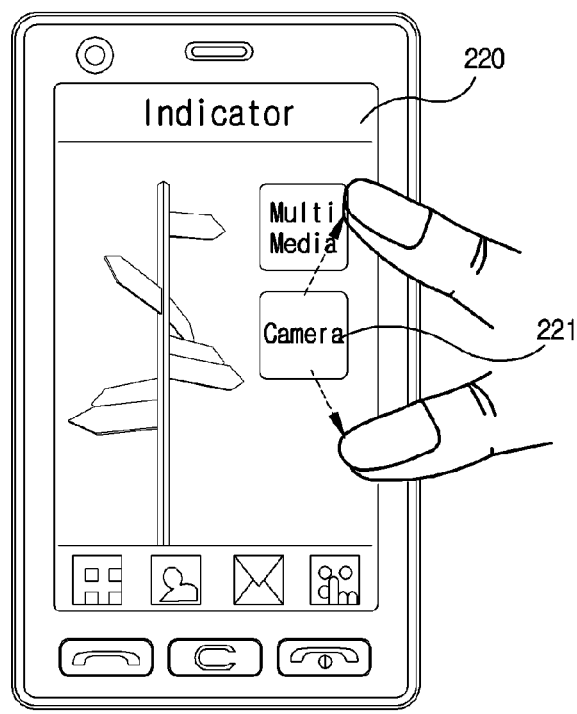
Figure 6D:
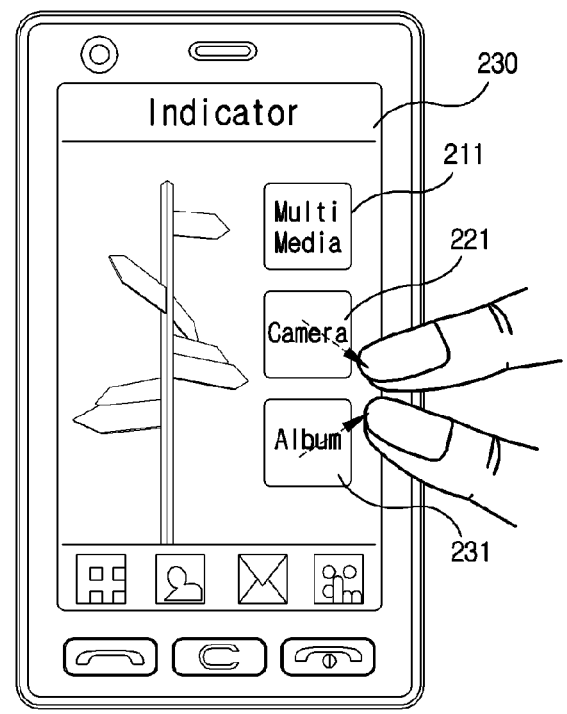
Figure 6E:
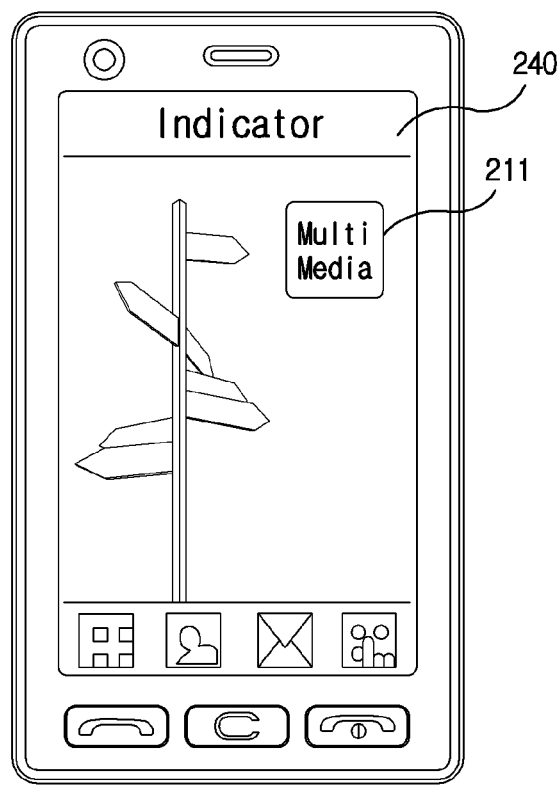
Figure 7:
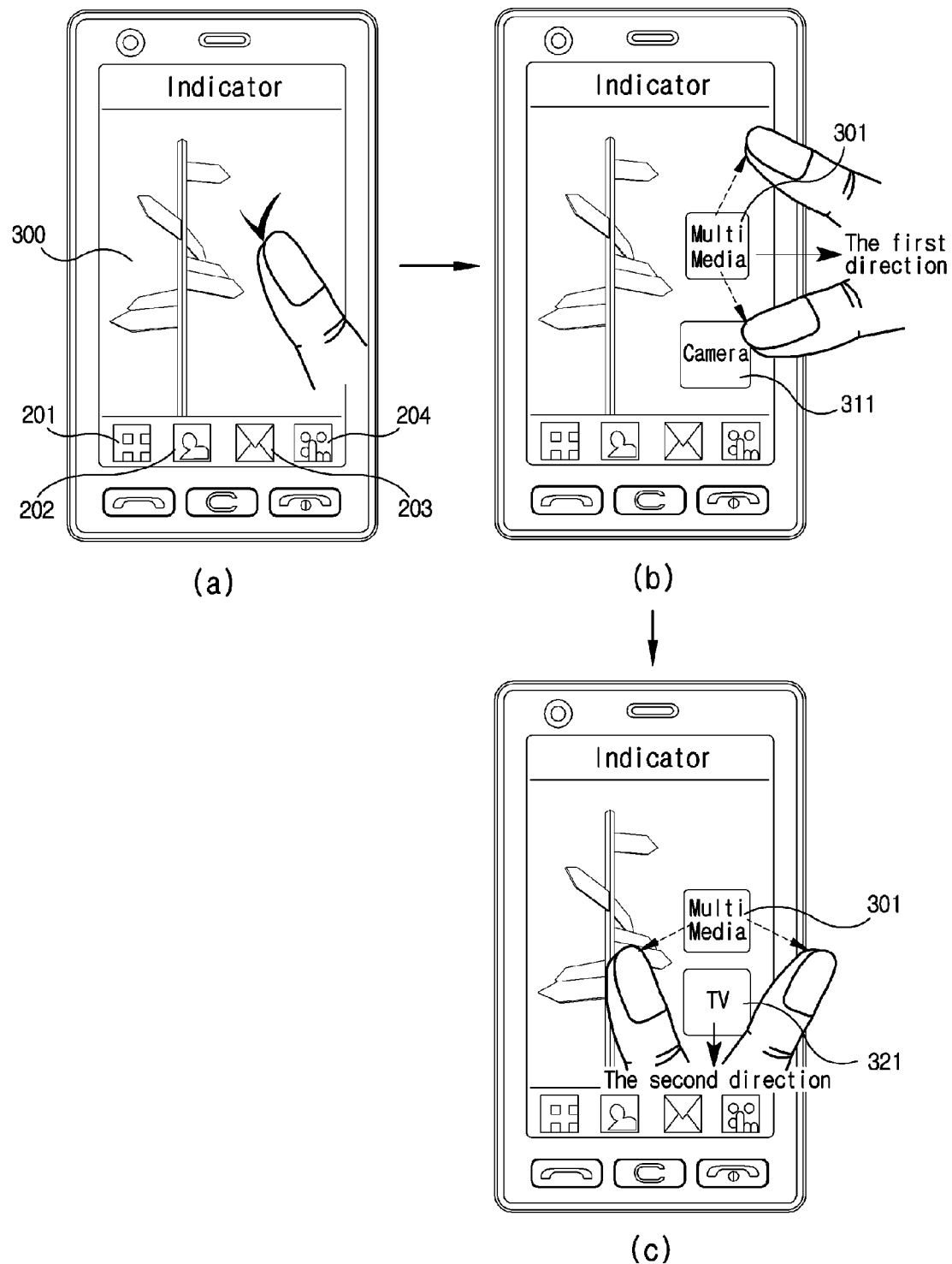
FIG. 7 with indications of (a)-(c) is an image diagram of a second implementation in the mobile terminal where the method for executing a menu in the mobile terminal is applied, according to the present disclosure.
Figure 8:
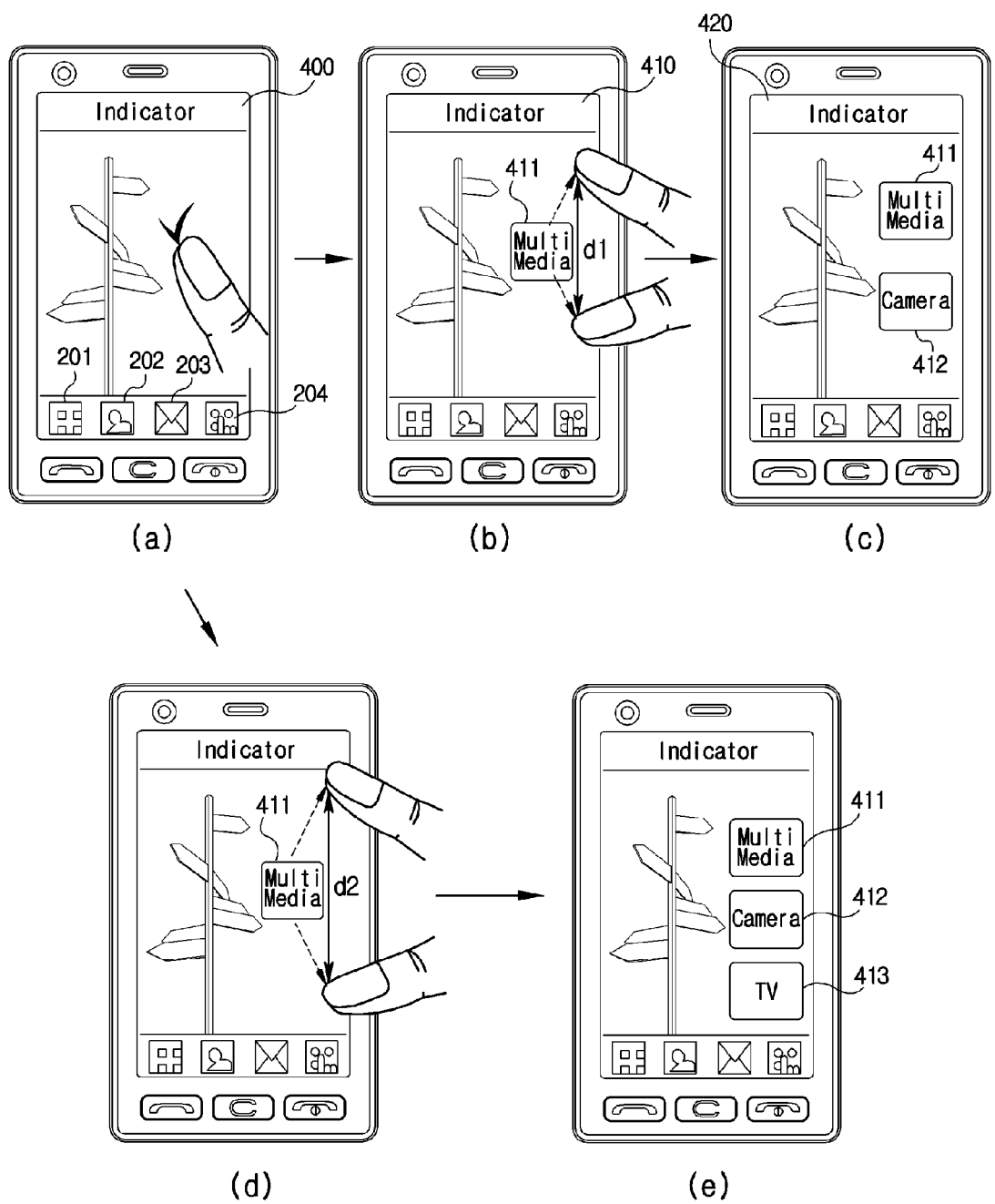
FIG. 8 with indications of (a)-(e) is an image diagram of a third implementation in the mobile terminal where the method for executing a menu in the mobile terminal is applied, according to the present disclosure.
Figure 9:
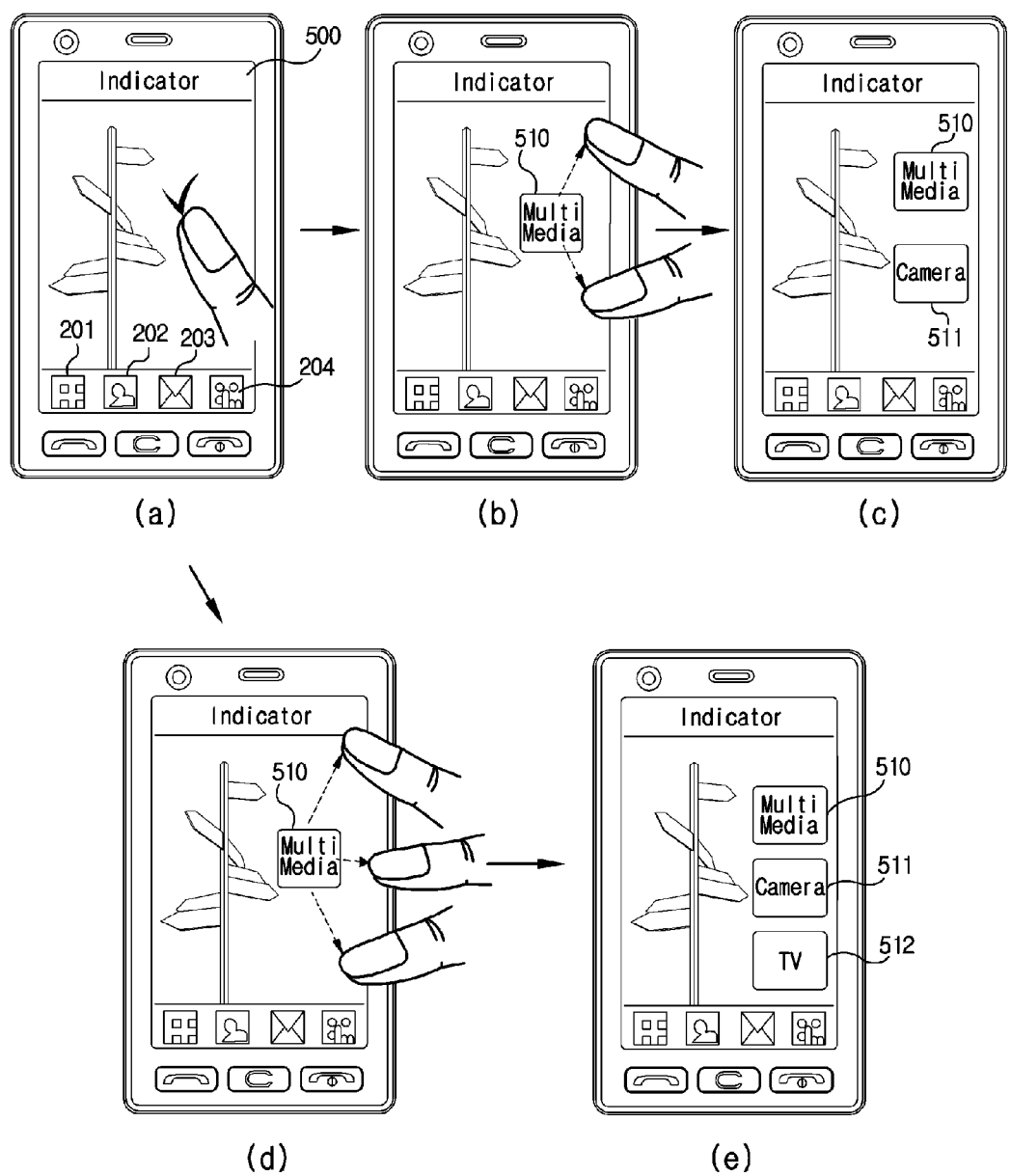
FIG. 9 with indications of (a)-(e) is an image diagram of a fourth implementation in the mobile terminal where the method for executing a menu in the mobile terminal is applied, according to the present disclosure.
Figure 10:
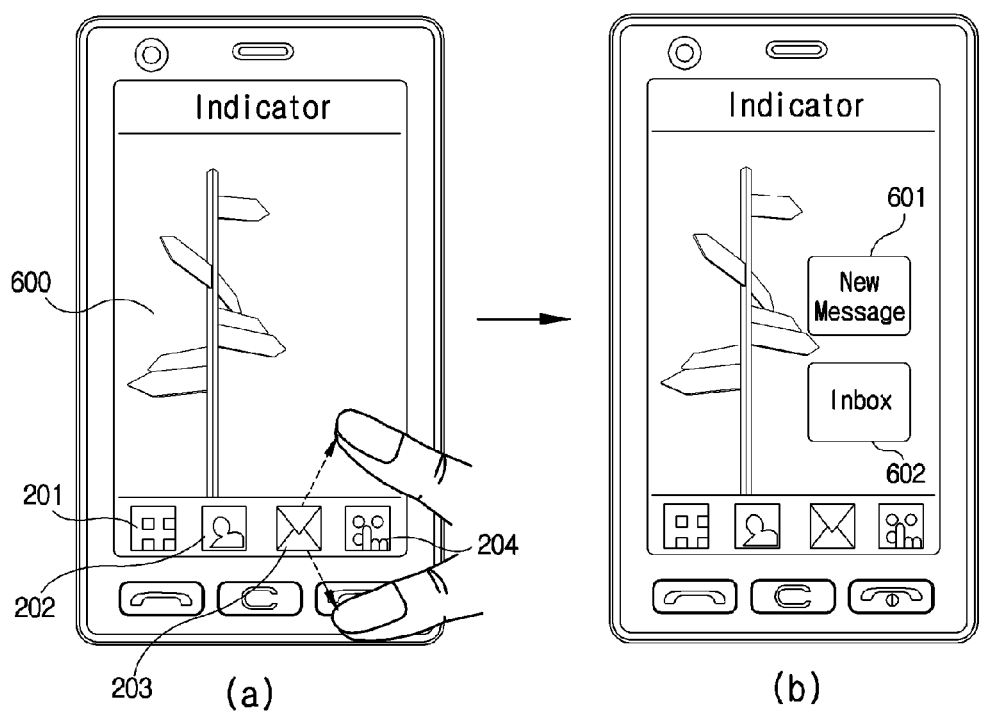
FIG. 10 with indications of (a)-(b) is an image diagram of a fifth implementation in the mobile terminal where the method for executing a menu in the mobile terminal is applied, according to the present disclosure.
Figure 11:
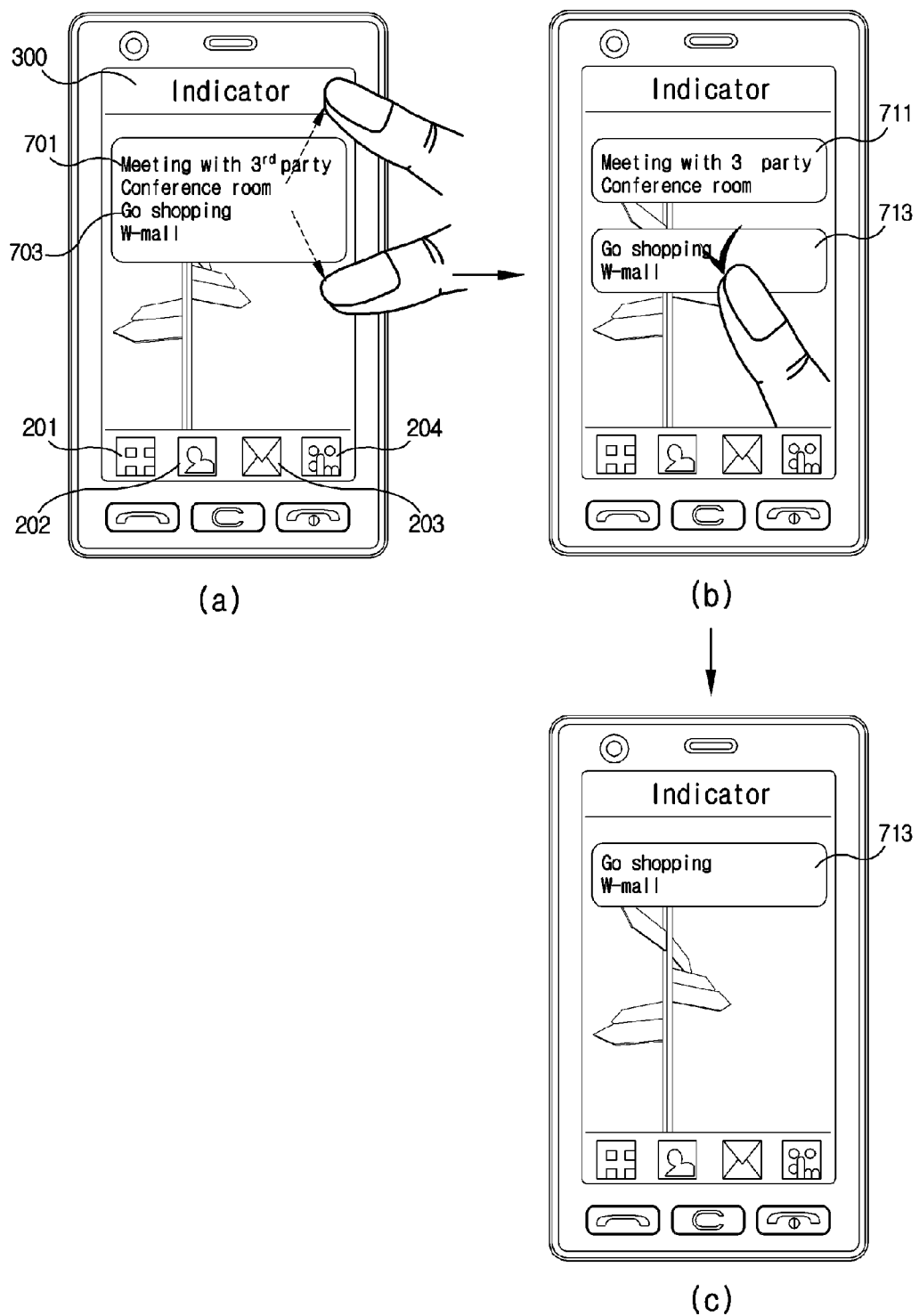
FIG. 11 with indications of (a)-(c) is an image diagram of a sixth implementation in the mobile terminal where the method for executing a menu in the mobile terminal is applied, according to the present disclosure.
Figure 12:
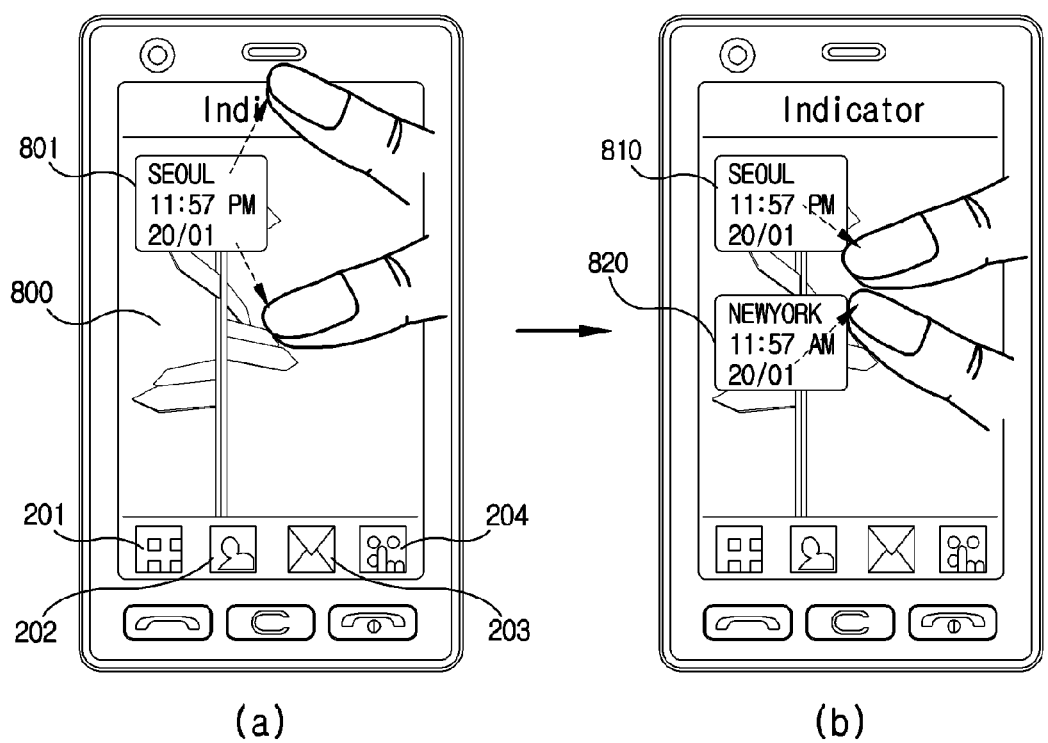
FIG. 12 with indications of (a)-(b) is an image diagram of a seventh implementation in the mobile terminal where the method for executing a menu in the mobile terminal is applied, according to the present disclosure.

FIGS. 6A-6E are an image diagram of the first implementation in the mobile terminal where the method for executing a menu in the mobile terminal is applied, according to the present disclosure, FIG. 7 is an image diagram of a second implementation in the mobile terminal where the method for executing a menu in the mobile terminal is applied, according to the present disclosure, FIG. 8 is an image diagram of a third implementation in the mobile terminal where the method for executing a menu in the mobile terminal is applied, according to the present disclosure, FIG. 9 is an image diagram of a fourth implementation in the mobile terminal where the method for executing a menu in the mobile terminal is applied, according to the present disclosure, FIG. 10 is an image diagram of a fifth implementation in the mobile terminal where the method for executing a menu in the mobile terminal is applied, according to the present disclosure, FIG. 11 is an image diagram of a sixth implementation in the mobile terminal where the method for executing a menu in the mobile terminal is applied, according to the present disclosure, and FIG. 12 is an image diagram of a seventh implementation in the mobile terminal where the method for executing a menu in the mobile terminal is applied, according to the present disclosure.

[First Exemplary Implementation]

FIGS. 6A-6E are an image diagram of the first implementation in the mobile terminal where the method for executing a menu in the mobile terminal is applied, according to the present disclosure. FIG. 6A illustrates a wall paper 200. The wall paper may include auto launcher menus 201-204. In this status, if the user touches any point on the wall paper 200, the first icon 211 is displayed. FIG. 6B illustrates a screen 210 where the first icon (multi media icon) is displayed. In this status, the user inputs a first multi touch gesture pattern on the first icon 211. Then, as shown in FIG. 6C, the second icon (camera icon) 221 is displayed on the display unit 151. Here, the first multi touch gesture pattern may be a gesture of spreading a thumb and an index finger after both fingers are touched on the touch screen. It should be understood that this gesture is only one example. Various modifications may be available. For example, if the first multi touch gesture pattern is inputted again on the second icon 221, as shown FIG. 6D, a third icon(album icon) 231 which is a low rank icon of the second icon 221 is displayed. The screen 230 shows that the first icon, the second icon, and the third icon are displayed on the display unit 151. In this status, if a second multi touch gesture pattern is inputted on the second icon 221 and the third icon 231, as shown in FIG. 6E, the display of the second icon 221 and the third icon 231 is removed. Here, the example of the second multi touch gesture may be a gesture of closing or narrowing a thumb and an index finger after both fingers are touched on the touch screen. It should be understood that this gesture is only one example. Various modifications may be available. The screen 240 shows that the display of the second icon 221 and the third icon 231 is removed. In this implementation, the gesture of closing or narrowing the two icons after selecting the two icon simultaneously is inputted. However, the present disclosure is not limited to the implementation. It is possible for user to select one icon with one finger, to touch other point where the icon is not displayed with other finger, and then to close or narrow fingers, so as to remove the display of one icon.

[Second Exemplary Implementation]

FIG. 7 is an image diagram of a second implementation in the mobile terminal where the method for executing a menu in the mobile terminal is applied, according to the present disclosure.

FIG. 7(a) illustrates a wall paper 300. The wall paper may include auto launcher menus 201-204. In this status, if the user touches any point on the wall paper 300, the first icon 301 is displayed. As shown in FIG. 7(b), if the user inputs a first multi touch gesture pattern on the first icon 301 wherein the first multi touch gesture pattern has a first direction, the second icon (camera icon) 311 is displayed near the first icon. At this time, the second icon may be a most frequent icon, the most recent icon, or the predetermined icon. Alternatively, as shown in FIG. 7(c), if the user inputs a first multi touch gesture pattern on the first icon, wherein the first multi touch gesture has a second direction of the bottom, another second icon 321 which is a sub icon (TV icon) of the first icon is displayed. At this time, the another icon may be a second most frequent icon or the second predetermined icon in the sub icons of the first icon.

In this implementation, the example where the most frequent icon or the second most frequent icon is generated based on the direction of the multi touch gesture pattern is explained. The present disclosure is not limited on the implementation. For example, the generating location of the second icon may be changed on basis of the direction of the multi touch gesture pattern. That is, if the gesture spreading a left side is inputted, the second icon may be generated on the left side of the first icon.

According to the present implementation, the different icon based on the direction of the multi touch gesture pattern may be created on the touch screen.

[Third Exemplary Implementation]

FIG. 8 is an image diagram of a third implementation in the mobile terminal where the method for executing a menu in the mobile terminal is applied, according to the present disclosure.

The third implementation is related to modification where the number of the second icons is determined on basis of a width of the multi touch gesture pattern.

FIG. 8(a) illustrates a wall paper 400. The wall paper may include auto launcher menus 201-204. In this status, if the user touches any point on the wall paper 400, the first icon 411 is displayed. FIG. 8(b) illustrates a screen where a first icon (multi media icon) 411 is displayed. The user inputs a first multi touch gesture pattern on the first icon 411. Here, the first multi touch gesture pattern may be a gesture of spreading a thumb and an index finger after both fingers are touched on the touch screen. Then, the controller 180 considers a width of the spreading gesture. The width d1 in FIG. 8(b) is in a range where a single second icon may be displayed. Accordingly, as shown in FIG. 8(c), the single second icon 412 (camera icon) is further displayed, wherein the second icon 412 is a low rank icon of the first icon. Reference number 420 is a screen where the first icon and the second icon are displayed together.

On the other hand, as shown in FIG. 8(*d*), in a state where the first icon is displayed on the wall paper 400, if a width d2 is a range where the two second icon may be displayed, as shown in FIG. 8(*e*), a camera icon 412 and a TV icon 413 are displayed on the display unit 151. At this time, the camera icon and the TV icon are respectively a most frequent icon and the second most frequent icon in the sub icons of the multi media icon 411. In other words, the controller 180 of the mobile terminal 100 detects a width of the multi touch gesture pattern, and determines the number of the second icon to be displayed on the display unit.

According to the present implementation, the user may easily select the number of the icons to be displayed by changing the width of the multi touch gesture pattern.

[Fourth Exemplary Implementation]

FIG. 9 is an image diagram of a fourth implementation in the mobile terminal where the method for executing a menu in the mobile terminal is applied, according to the present disclosure.

The fourth implementation is related to modification where the number of the second icons is determined on basis of the number of simultaneous touch in the multi touch gesture pattern.

FIG. 9(*a*) illustrates a wall paper 500. The wall paper may include auto launcher menus 201-204. In this status, if the user touches any point on the wall paper 500, the first icon 510 is displayed. As shown in FIG. 9(*b*), the user inputs a first multi touch gesture pattern on the first icon 510. Here, the first multi touch gesture pattern may be a gesture of spreading a thumb and an index finger after both fingers are touched on the touch screen. Then, the controller 180 considers the number of the simultaneous touch in the first multi touch gesture pattern.

The number of simultaneous touches in FIG. 9(*b*) is two, and the controller 180 displays a single second icon (camera icon) 511 on the display unit 151(FIG. 9(*c*)).

On the other hand, as shown in FIG. 9(*d*), in a state where the first icon 510 is displayed on the wall paper 500, if three fingers are touched on the first icon 510 at the same time for inputting the first touch gesture pattern, as shown in FIG. 9(*e*), two icons, a camera icon 511 and a TV icon 512, are displayed on the display unit 151. At this time, the camera icon 511 and the TV icon 512 are respectively a most frequent icon and the second most frequent icon in the sub icons of the multi media icon 510. Alternatively, the camera icon and the TV icon may be a predetermined icon. The controller 180 of the mobile terminal 100 detects the simultaneous touches of the multi touch gesture pattern, and determines the number of the second icon to be displayed on the display unit.

According to the present implementation, the user may easily select the number of the icons to be displayed by changing the number of the simultaneous touches in the multi touch gesture pattern.

[Fifth Exemplary Implementation]

FIG. 10 is an image diagram of a fifth implementation in the mobile terminal where the method for executing a menu in the mobile terminal is applied, according to the present disclosure.

The fifth implementation is related to modification using the auto launcher menu.

FIG. 10(*a*) illustrates a wall paper 600. The wall paper may include auto launcher menus 201-204. In this status, the user selects one 203 of the auto launcher menus 201-204 to input the first multi touch gesture pattern on the selected auto launcher menu 203. Here, the first multi touch gesture pattern may be a gesture of spreading a thumb and an index finger after both fingers are touched on the touch screen. As shown in FIG. 10B, an inbox icon 602 and new message box icon 601 which is a low rank icon of the inbox icon 602 are displayed on the wall paper 600 together. Here, if the user inputs a second multi touch gesture pattern on the inbox icon 602 and the new message box icon 601, the display of the inbox icon and the new message box icon is removed.

According to the present implementation, the user may easily access the wanted menu by inputting the multi touch gesture pattern on the auto launcher menu.

[Sixth Exemplary Implementation]

FIG. 11 is an image diagram of a sixth implementation in the mobile terminal where the method for executing a menu in the mobile terminal is applied, according to the present disclosure.

The sixth implementation is related to modification using the memo widget displayed on the wall paper.

FIG. 11A illustrates a wall paper 700. The wall paper may include a memo widget with auto launcher menus 201-204. The memo widget may include at least two memo contents 701, 703. Reference number 701 is a first memo, and reference number 703 is a second memo. In this status, if the user inputs the first multi touch gesture pattern on the memo widget, as shown in FIG. 11B, a first memo widget 711 and a second memo widget 713 are displayed. In this status, if the touch signal for selecting the second widget memo 713 is generated, the display of the first memo widget 711 is removed, as shown in FIG. 11C.

[Seventh Exemplary Implementation]

FIG. 12 is an image diagram of a seventh implementation in the mobile terminal where the method for executing a menu in the mobile terminal is applied, according to the present disclosure.

The seventh implementation is related to modification using the clock widget.

FIG. 12(*a*) illustrates a wall paper 800. The wall paper may include a clock widget 801 with auto launcher menus 201-204. In this status, if the user inputs the first multi touch gesture pattern on the clock widget 801, as shown in FIG. 12(*b*), a first clock widget 810 and a second clock widget 820 are displayed. At this time, the first clock widget 810 and the second clock widget 820 may indicate the same local time. Alternatively, the second clock widget 820 may indicates a different local time which the user has set up. For example, the first clock widget indicates a Seoul local time, while the second clock widget indicates a New York local time. If the second multi touch gesture pattern is inputted on the first clock widget 810 and the second clock widget 820, only the clock widget 801 is displayed.

According to the present implementation, the user may easily generate a dual clock widget by the multi touch gesture pattern.

The above-described methods can be implemented in a program recorded medium as computer-readable codes. The computer-readable media may include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

Thus, it is intended that embodiments of the present disclosure may cover the modifications and variations of this disclosure provided they come within the scope of the appended claims and their equivalents.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for executing a menu in a mobile terminal, the method comprising:
   displaying a first icon on a touch screen of the mobile terminal according to a user touch input, the first icon including a menu icon stored in the mobile terminal;
   receiving a first multi-touch gesture pattern on the first icon;
   determining at least a width and a direction of the first multi-touch gesture pattern;
   determining a number of at least one or more of second icons according to the width and determining a type of at least one or more of second icons according to the direction;
   wherein a second icon is a sub-icon of the first icon;
   wherein the width determines a number of one or more second icons by varying linearly according to the width of the first multi-touch gesture pattern on the first icon;
   wherein the direction determines the type of the one or more second icons such that there are at least three different directions wherein a first direction will cause the type to be a most frequently displayed icon, a second different direction will cause the type to be a most recently displayed icon and a third different direction will cause the type to be a set sub-icon that is related to the first icon;
   continuing to display the first icon and displaying the at least one or more of the second icons according to at least the width and the direction of the first multi-touch gesture pattern;
   receiving a second multi-touch gesture pattern on one of the at least one or more second icons, the second multi-touch gesture pattern comprising a gesture pattern for removing the at least one or more second icons wherein the second multi-touch gesture pattern is the reverse gesture pattern of the first multi-touch gesture pattern; and
   continuing to display the first icon and no longer displaying the at least one or more second icons in response to the second multi-touch gesture pattern.

2. The method of claim 1, further comprising:
   determining a number of simultaneous touches of the first multi-touch gesture pattern; and
   displaying one of more of the at least one second icon according to the number of determined simultaneous touches.

3. The method of claim 1, wherein the first icon comprises at least a widget or an auto-launch menu displayed on a wallpaper of the touch screen.

4. The method of claim 1, wherein the at least one second icon comprises a widget displayed on a wallpaper of the touch screen.

5. The method of claim 1, wherein the at least one second icon is displayed as a lower rank icon relative to the first icon.

6. A mobile terminal comprising:
   a touch screen configured to display information; and
   a controller configured to:
   cause the touch screen to display a first icon according to a user touch input, the first icon including a menu icon stored in the mobile terminal;
       determine at least a width and a direction of a first multi-touch gesture pattern received on the first icon;
       determining a number of at least one or more of second icons according to the width and determining a type of at least one or more of second icons according to the direction;
   wherein a second icon is a sub-icon of the first icon;
   wherein the width determines a number of one or more second icons by varying linearly according to the width of the first multi-touch gesture pattern on the first icon:
   wherein the direction determines the type of the one or more second icons such that there are at least three different directions wherein a first direction will cause the type to be a most frequently displayed icon, a second different direction will cause the type to be a most recently displayed icon and a third different direction will cause the type to be a set sub-icon that is related to the first icon;
   cause the touch screen to continue to display the first icon and display at least one or more second icons according to at least the width and the direction of the first multi-touch gesture pattern, and
   cause the touch screen to continue to display the first icon and no longer display the at least one or more second icons when a second multi-touch gesture pattern is received on one of the at least one second icon, the second multi- touch gesture pattern comprising a touch gesture pattern for removing the at least one or more second icons wherein the second multi-touch gesture pattern is the reverse gesture pattern of the first multi-touch gesture pattern.

7. The mobile terminal of claim 6, wherein the controller is further configured to:
   determine a number of simultaneous touches of the first multi-touch gesture pattern; and
   cause the touch screen to display one or more of the least one second icon according to the number of simulations touches.

8. The mobile terminal of claim 6, wherein the first icon comprises at least a widget or an auto-launch menu display on a wallpaper of the touch screen.

9. The mobile terminal of claim 6, wherein at least one second icon comprises a widget displayed on a wallpaper of the touch screen.

10. The mobile terminal of claim 6, wherein the controller is further configured to cause the touch screen to display the at least one second icon as a lower rank icon relative to the first icon.

* * * * *